(12) United States Patent
Patterer

(10) Patent No.: US 11,163,441 B2
(45) Date of Patent: Nov. 2, 2021

(54) MICRO-RADIAL CHART GRAPHICAL USER INTERFACE

(71) Applicant: SAP SE, Walldorf (DE)

(72) Inventor: Alexander Patterer, Wiesloch (DE)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 16/442,313

(22) Filed: Jun. 14, 2019

(65) Prior Publication Data

US 2020/0393962 A1  Dec. 17, 2020

(51) Int. Cl.
  *G06F 3/048* (2013.01)
  *G06F 3/0488* (2013.01)
  *G06F 3/0482* (2013.01)

(52) U.S. Cl.
  CPC ........ *G06F 3/04886* (2013.01); *G06F 3/0482* (2013.01); *G06F 2203/04803* (2013.01)

(58) Field of Classification Search
  CPC ............... G06F 3/04886; G06F 3/0482; G06F 2203/04803; G06F 16/289
  See application file for complete search history.

(56) References Cited

U.S. PATENT DOCUMENTS

| | | | | |
|---|---|---|---|---|
| 7,830,814 B1* | 11/2010 | Allen | ................... | H04L 12/1822 370/252 |
| 8,965,796 B1* | 2/2015 | Gala | ..................... | G06Q 20/203 705/28 |
| 2004/0059242 A1* | 3/2004 | Masuo | ................. | A61B 5/0537 600/547 |
| 2008/0059267 A1* | 3/2008 | Hamilton | ............... | G06Q 10/00 705/7.15 |
| 2010/0023355 A1* | 1/2010 | Sagalow | ................ | G06Q 40/08 705/4 |
| 2012/0123989 A1* | 5/2012 | Yu | ...................... | G06Q 10/0639 706/47 |
| 2014/0043325 A1* | 2/2014 | Ruble | ................. | G06F 3/04842 345/419 |
| 2015/0286802 A1* | 10/2015 | Kansara | ................. | G16H 10/20 705/3 |
| 2015/0332198 A1* | 11/2015 | Toro | .................... | G06Q 10/0637 705/7.39 |
| 2016/0103592 A1* | 4/2016 | Prophete | ............. | G06F 3/04845 715/771 |
| 2017/0140244 A1* | 5/2017 | Sharma | ................. | G06K 9/6212 |
| 2019/0236116 A1* | 8/2019 | Sinha | ...................... | G06F 40/18 |

* cited by examiner

*Primary Examiner* — Tadesse Hailu
*Assistant Examiner* — Asteway T Gattew
(74) *Attorney, Agent, or Firm* — Erise IP, P.A.

(57) ABSTRACT

In a first part of a graphical user interface, information can be rendered about an entity. In a second part of the graphical user interface (which differs from the first part), a plurality of micro-radial charts are displayed that each illustrate status information for one of a plurality of a categories of computer-implemented processes for the entity. Each micro-radial chart has a circular element superimposed around a numerical value specifying a number of active processes associated with the category. The circular element visually conveys a level of completion of the corresponding processes. The numerical values and the level of completion conveyed on the circular elements are automatically updated when the corresponding processes are completed. Related apparatus, systems, techniques and articles are also described.

17 Claims, 6 Drawing Sheets

MICRO-RADIAL CHART GRAPHICAL USER INTERFACE

TECHNICAL FIELD

The subject matter described herein relates to advanced graphical user interfaces employing micro-radial charts that more efficiently convey status information in a compact display.

BACKGROUND

Complex computer-implemented processes are increasingly being controlled and monitored using handheld computing devices such as mobile phones and tablets. Many of such computing devices employ touch-screens which allow users to manipulate elements within rendered graphical user interfaces to obtain information about such computer-implemented processes.

SUMMARY

Various aspects relating to visualizations are provided herein. In a first part of a graphical user interface, information can be rendered about an entity. In a second part of the graphical user interface (which differs from the first part), a plurality of micro-radial charts are displayed that each illustrate status information for one of a plurality of a categories of computer-implemented processes for the entity. Each micro-radial chart has a circular element superimposed around a numerical value specifying a number of active processes associated with the category. The circular element visually conveys a level of completion of the corresponding processes. The numerical values and the level of completion conveyed on the circular elements are automatically updated when the corresponding processes are completed.

The circular element of each micro-radial chart can superimpose a numerical value specifying a total number of processes associated with the category including both active and completed processes.

User-generated input can be received via the graphical user interface horizontally swiping at least one of the micro-radial charts. In such case, at least one additional micro-radial chart can be displayed in the second part of the graphical user interface replacing at least one of the plurality of originally displayed micro-radial charts. The at least one additional micro-radial chart can illustrate status information for a different one of a plurality of a categories of computer-implemented processes as previously displayed.

The graphical user interface can also include a third part (different from the first and second parts) in which additional information associated with the entity can be displayed.

One or all of the micro-radial charts can be implemented using a reusable component which can, for example, be embedded within a host floorplan. With such an arrangement, a configuration class and a leading object attribute value can both be registered with a radial chart controller class. The leading object attribute value can also be registered with a query configuration provider class so that a query configuration can be obtained from the query configuration provider class. The query configuration can later be used to executing queries against a data source to obtain query results. The query results can be used to automatically update the numerical values and the levels of completion visually conveyed on the circular elements when the corresponding processes are completed.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for enhanced graphical user interfaces for more efficiently conveying status information about associated computer-implemented processes. Furthermore, a graphical user interface component is provided that can be registered to and reused by different applications.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced graphical user interfaces which employ micro-radial charts to efficiently display information (e.g., information parameters, etc.) associated with computed-implemented processes such as computer-implemented business processes. The micro-radial charts, in some variations, are able to be reused across different application through a registration process such as described below. A configuration framework is also provided that can be reused across different applications while, at the same time, providing a graphical user interface with a consistent look and feel.

Figure 1:
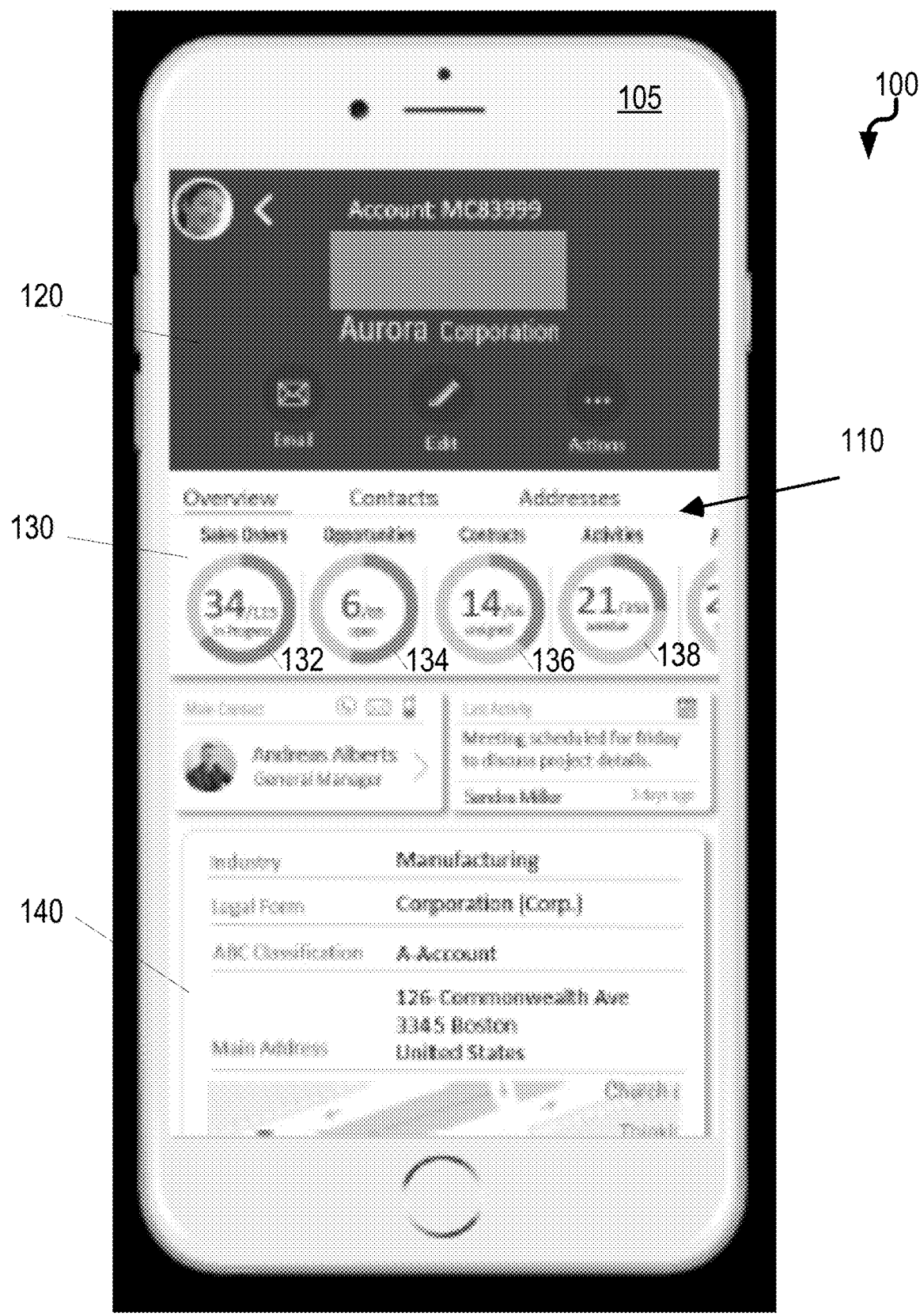
FIG. 1 is a diagram illustrating a graphical user interface with micro-radial charts.

FIG. 1 is a diagram 100 illustrating a sample graphical user interface 110 rendered on a mobile computing device 105 (in this case a mobile phone having a touch screen interface). The graphical user interface 110 can include a top portion 120, a middle portion 130, and a bottom portion 140. The top portion 120 can, for example, include information about a particular account for which there are numerous associated computer-implemented processes. The top portion 120 can include various graphical user interface elements which, when executed, can cause one or more actions to occur such as generation of an e-mail, editing contact information, or taking other action. The bottom portion 140 can include other information about the particular account such as contact information, address, and the like. The bottom portion 140 can also include graphical user interface elements to trigger additional actions including display of different information within the bottom portion 140.

The middle portion 130 can include one or more micro-radial charts 132, 134, 136, 138. Each micro-radial chart can include a circular element which visually indicates a level of completion of associated business processes. In this example, the micro-radial chart 132 corresponds to sales orders and the numerical values within the circular element indicate that 34 sales order related computer-implemented processes out of a total of 123 such processes are still in progress. In other variations, the number of complete processes can be numerically represented (e.g., 89 completed processes out of 123 processes, etc.). Similarly, micro-radial chart 134 illustrates a level of completion of opportunities related computer-implemented processes, micro-radial chart 136 illustrates a level of completion of contracts related computer-implemented processes, and micro-radial chart 138 illustrates a level of completion of activities related computer implemented processes. The number of displayed micro-radial charts can vary. In some cases, not all of the micro-radial charts can be displayed at the same time in the middle portion 130. In such cases, the graphical user interface 110 can allow a user via user-generated input to swipe left or right to see different micro-radial charts as may be desired (and associated with different categories of computer-implemented processes).

Figure 2:
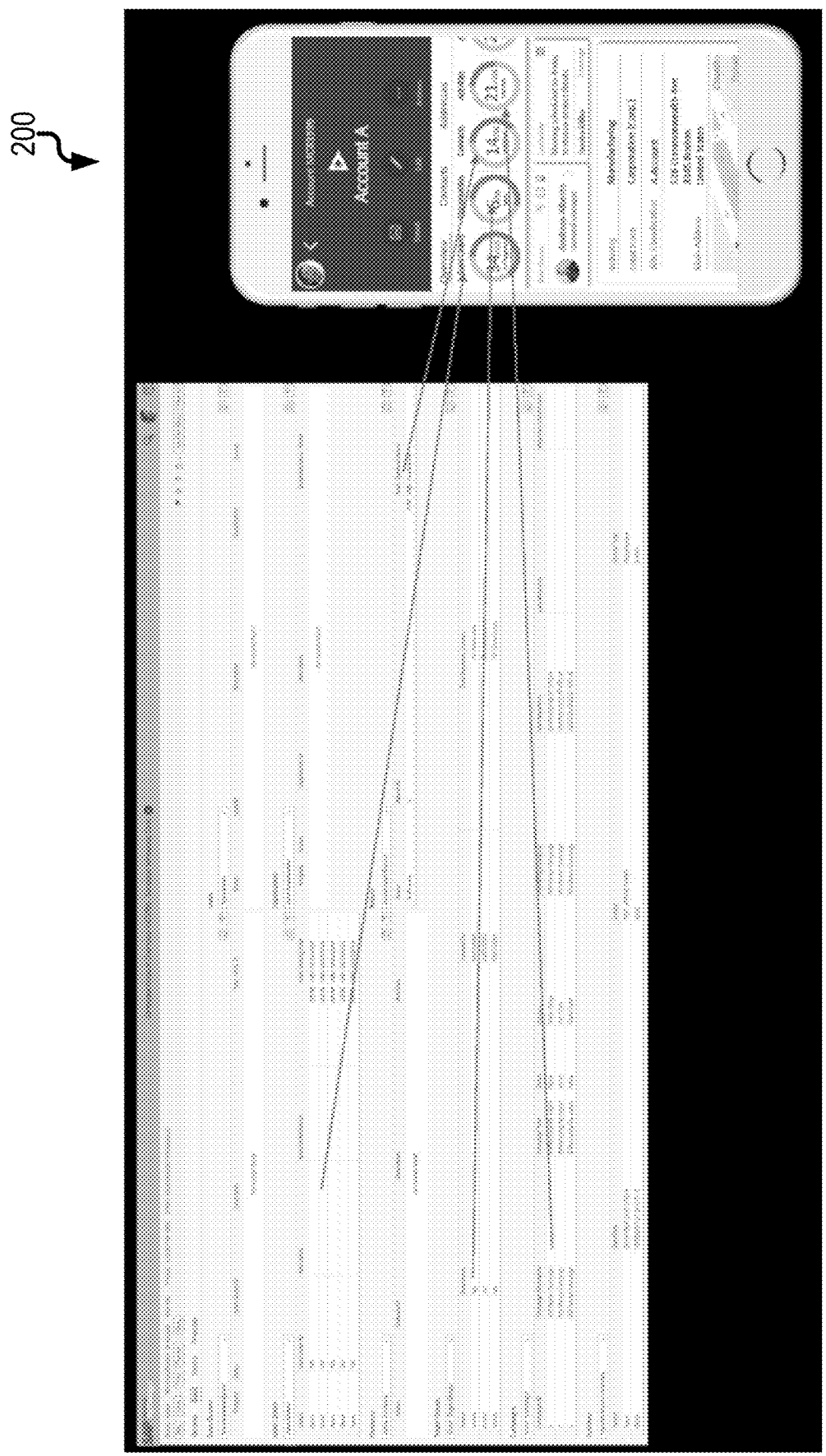
FIG. 2 is a diagram mapping a graphical user interface with micro-radial charts with a conventional interface.

FIG. 2 is a diagram 200 illustrating a conventional graphical interface 210 for displaying the information encapsulated within the graphical user interface 110 displayed on the computing device 105. As will be appreciated, the complex information rendered in the conventional graphical user interface 210 is efficiently and compactly presented in the middle portion 130 of the graphical user interface 110 displayed on the computing device 105.

Figure 3:
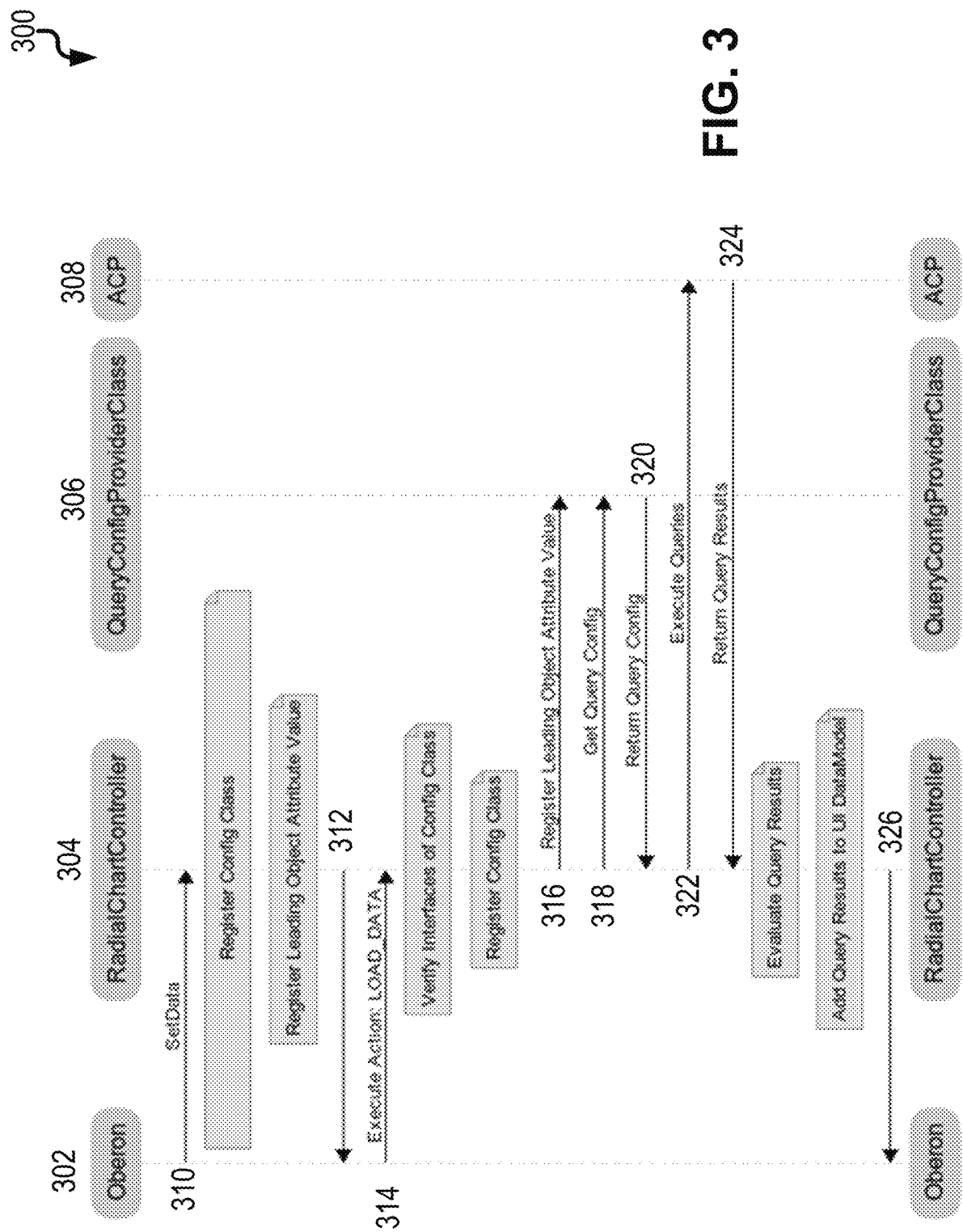
FIG. 3 is a sequencing diagram illustrating the registration and updating of micro-radial charts in a graphical user interface such as illustrated in FIG. 1.

FIG. 3 is a diagram 300 illustrating sequencing with regard to the registration of a configuration class and updating of a micro-radial chart in a graphical user interface. The processes described herein can use a variety of programming language including without limitation Oberon 302. The sequence diagram illustrates signaling among an Oberon component 302, a radial chart controller 304, a query configuration provider class 306, and an ABAP change proxy 308 (i.e., an interface to a data source, etc.) The sequence diagram can have various technical artifacts such as those provided below in Table 1.

TABLE 1

| Class | Description |
| --- | --- |
| MOB_MCR_RDL_CTRL | Message Class for Error Messages related to CUIBB Micro Radial Charts |
| CL_MOB_RADIAL_ACCOUNT_CFG | Configuration Class for Micro Radial Chart CUIBB (acts as a data provider) |
| CL_MOB_RADIAL_CHART_CT RL | Controller Logic Class for Micro Radial Chart CUIBB |
| IF_MOB_RADIAL_CHART_CO NFIG | Interface for Data Provider Classes; needed to be implemented to conform to the required methods of CUIBB Controller |

Initially, at 310, a method call is initiated to register the configuration class and to register the leading object attribute value. The configuration class is used to determine which queries to call to fill the radial attribute. The leading object attribute value is used to filter the queries. Thereafter, at 312, data is sent indicating that the method call is finished and returns to the processing within the Oberon framework 302.

At 314, a method call is initiated to the controller class 304 which includes an action to load data. Within the chart controller, there can be specific coding that verifies certain aspects such as when a configuration class is given. If a configuration class is not given, then the controller class cannot execute queries. Optionally, the configuration class can be stored to enable queries to be performed. Subsequently, at 316, the controller class 304 then then executes different methods in the query configuration provider class. Initially, the leading object attribute value is passed. Further, at 318, the query configuration is obtained from the query configuration provider class 306. The query configuration can include, for example, a query name, a particular business object, and various parameters). At 320, the query configuration provider class returns the query configuration so that, at 322, the controller class can execute queries using the query configuration (and results are returned at 324). The query results can be evaluated and returned to the Oberon component 302 for rendering. The query results can, for example, provide information specifying a number of open or closed processes for a specific business process (and a number of overall business processes)

The configuration class can take various forms (e.g., CL_MOB_RADIAL_ACCOUNT_CFG for Accounts). Application developers embedding the embedded component in a user interface can decide which data to show by implementing a configuration class that follows the defined interface (IF_MOB_RADIAL_CHART_CONFIG). With this arrangement, within a configuration class all Business Object- or Enhanced Controller Object Queries can be set along with the desired selection parameters. Further, within a configuration class one Leading Object Attribute can be specified that, in turn, can act as the leading information to identify the involvement in the computer-implemented processes (e.g., "AccountID", etc.). This leading object attribute can be used to identify in which category the associated micro-radial chart element is to be associated.

Only the query information needs to be passed to the component. The data retrieval, data binding and rendering is exclusively taken care by the embedded component and the controller class (CL_MOB_RADIAL_CHART_CTRL). To provide the texts that are shown on the UI like the titles, a utility method CL_MOB_RADIAL_CHART_CTRL=>GET_UI_TEXT can be used that determines translatable MDRS user interface texts during runtime. The configuration class is passed to the embedded component during design time by the application developer.

Figure 4:
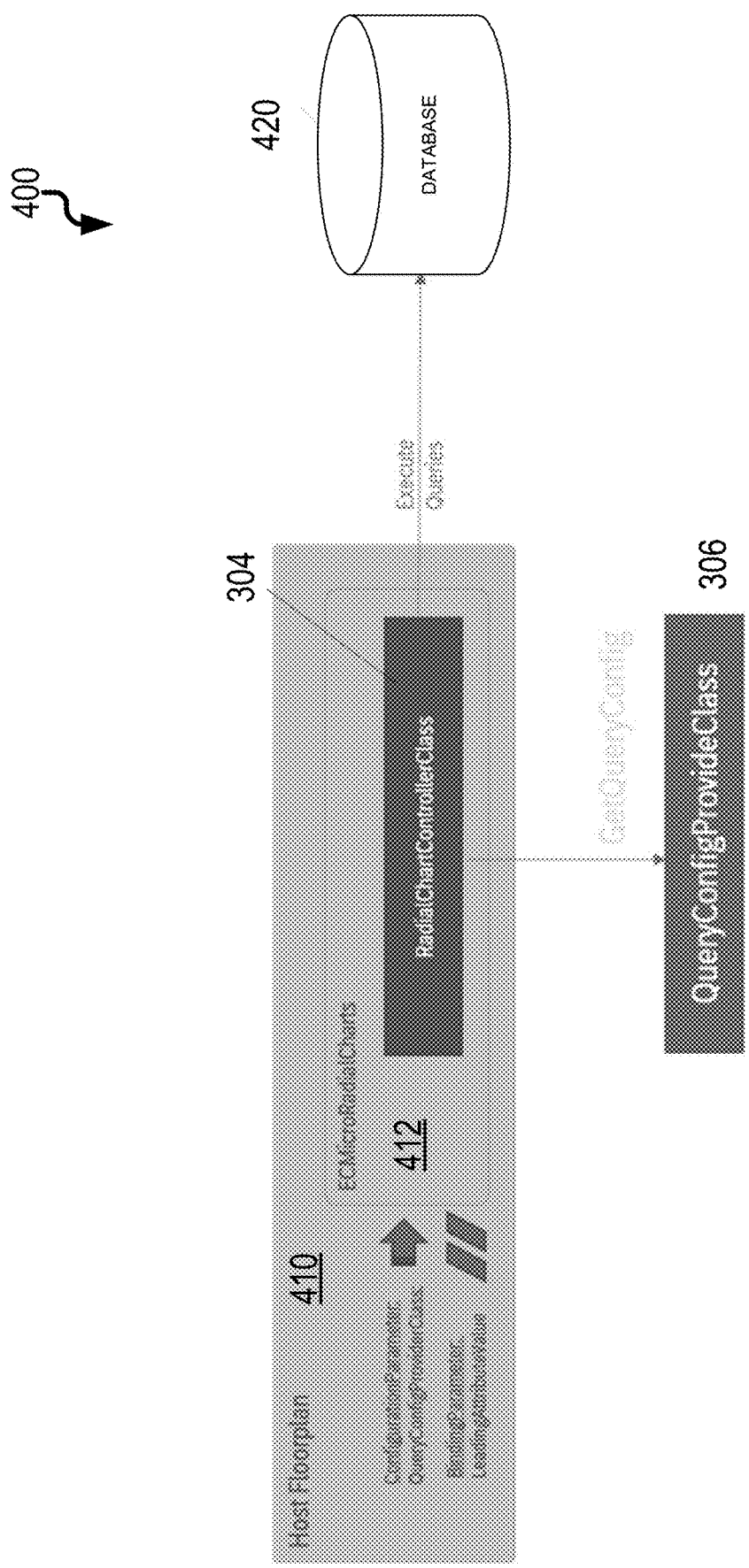
FIG. 4 is an example architecture diagram for rendering micro-radial charts in a graphical user interface.

FIG. 4 is a diagram 400 which illustrates a configuration framework that includes a host floor plan 410. The host floorplan 410 can, for example, be a single user interface (UI) view that embeds a specific component 412 that can be reused across different UI view. A host floorplan 410 can execute queries against a data source 420 (e.g., a fast service infrastructure) to determine a current status (e.g., completed, in progress, not yet started, etc.) of various business processes. Such queries can originate via the radial chart controller class which can cause corresponding radial charts 412 to be updated. During runtime, the query configuration provider class 306 within the embedded component 412 is passed to the radial chart controller class 304 (CL_MOB_RADIAL_CHART_CTRL). The radial chart controller class 304 can call the interface method IF_MOB_RADIAL_CHART_CONFIG~SET_LEADING_OBJECT_ATTRIBUTE ( )to inform the configuration class about the leading object attribute value. Then IF_MOB_RADIAL_CHART_CONFIG~GET_CONFIG( )is called to determine the query configuration. As a last step the radial chart controller 304 executes all the queries of the database 420 that are determined via the query provider configuration class 306. The query results are mapped to a user interface data model via Oberon API and passed at 326 to the graphical user interface. There the data model is parsed and rendered in the radial charts 412 (e.g., UI5 radial charts).

Figure 5:
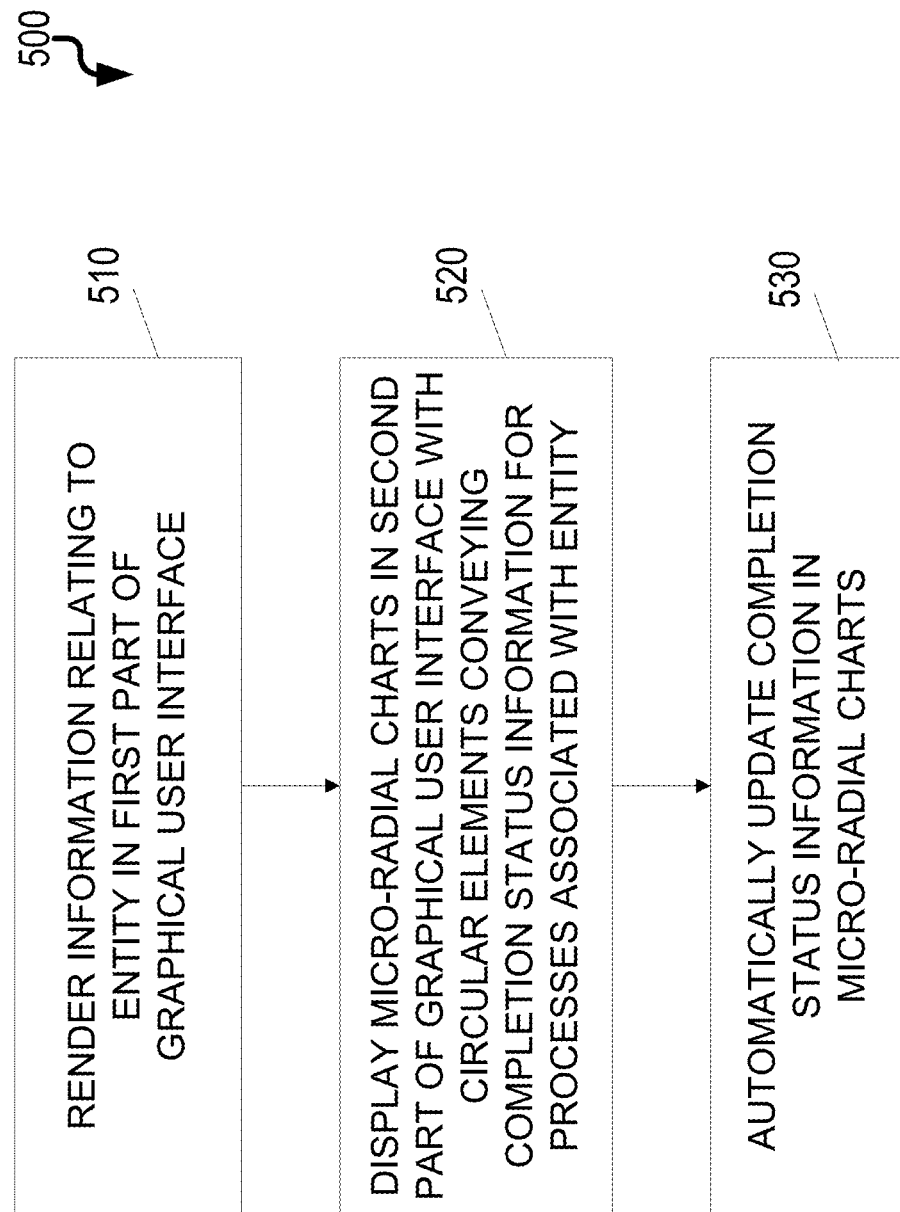
FIG. 5 is a process flow diagram illustrating the rendering of a graphical user interface with micro-radial charts.

FIG. 5 is a process flow diagram 500 in which, at 510, information about an entity is rendered in a first part a graphical user interface information about an entity. In addition, at 520, a plurality of micro-radial charts are illustrated in a second part of the graphical user interface distinct and separate from the first part of the graphical user interface. The micro-radial charts each illustrate status information for one of a plurality of a categories of computer-implemented processes for the entity. In particular, each micro-radial chart includes a circular element superimposed around a numerical value specifying a number of active processes associated with the category/The circular element visually conveys a level of completion of the corresponding processes (i.e., different shading or other visual distinction, etc.). The numerical values and the levels of completion visually conveyed on the circular elements are automatically updated at 530 when the corresponding processes are completed.

Figure 6:
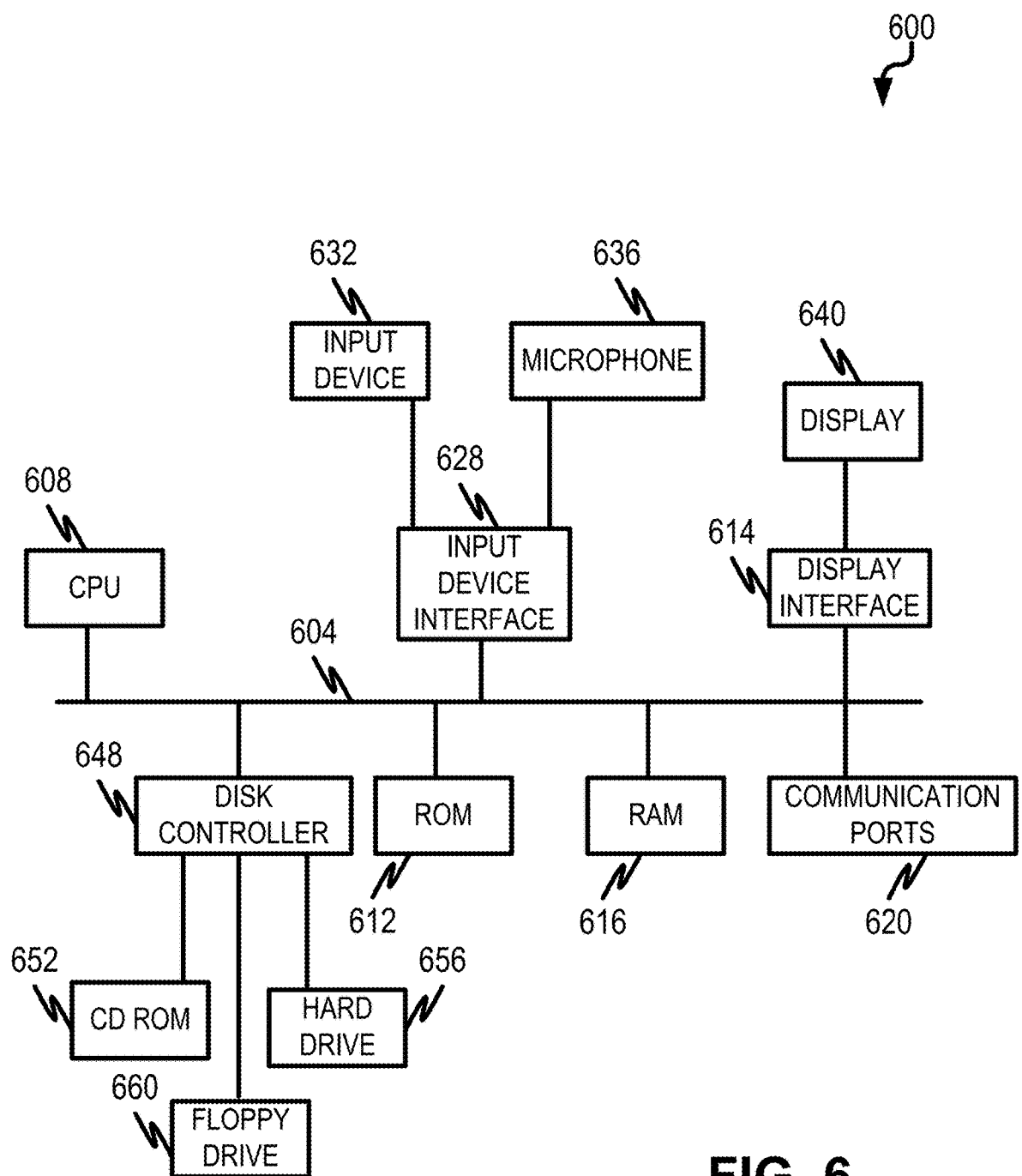
FIG. 6 is a diagram illustrating a computing device for implementing aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
  rendering, in a first part of a graphical user interface information, about an entity;
  displaying, in a second part of the graphical user interface distinct and separate from the first part of the graphical user interface, a plurality of micro-radial charts that each illustrate status information for one of a plurality of categories of computer-implemented processes for the entity, each micro-radial chart having a circular element superimposed around a numerical value specifying a number of active processes associated with the category, the circular element visually conveying a level of completion of a corresponding number of active processes; and
  automatically updating the numerical values and the levels of completion visually conveyed on the circular elements when the corresponding processes are completed such that the circular element advances on a clockwise basis until reaching a full circle which indicates that all of the processes for such category are completed, the automatic updating comprising:
    executing queries by a radial chart controller class to an interface to a data source to obtain query results specifying a number of open or closed processes, the queries being specified by a configuration class registered with the radial chart controller class and filtered by a leading object attribute value registered with the radial chart controller class.

2. The method of claim 1, wherein the circular element of each micro-radial chart further superimposes a numerical value specifying a total number of processes associated with the category including both active and completed processes.

3. The method of claim 1 further comprising:
  receiving user-generated input via the graphical user interface horizontally swiping at least one of the micro-radial charts; and
  displaying at least one additional micro-radial chart in the second part of the graphical user interface replacing at least one of the plurality of originally displayed micro-radial charts, the at least one additional micro-radial chart illustrating status information for a different one of a plurality of a categories of computer-implemented processes as previously displayed.

4. The method of claim 1 further comprising:
  displaying, in a third part of the graphical user interface distinct and separate from the first and second parts of the graphical user interface, further information associated with the entity.

5. The method of claim 1 further comprising:
  registering the leading object attribute value with a query configuration provider class; and
  obtaining a query configuration from the query configuration provider class.

6. The method of claim 5 further comprising:
  executing queries against a data source using the query configuration to obtain query results.

7. The method of claim 6, wherein the query results are used to automatically update the numerical values and the levels of completion visually conveyed on the circular elements when the corresponding processes are completed.

8. A system comprising:
  at least one data processor;
  memory storing instructions, which when executed by the at least one data processor, result in operations comprising:

rendering, in a first part of a graphical user interface information, about an entity;

displaying, in a second part of the graphical user interface distinct and separate from the first part of the graphical user interface, a plurality of micro-radial charts that each illustrate status information for one of a plurality of categories of computer-implemented processes for the entity, each micro-radial chart having a circular element superimposed around a numerical value specifying a number of active processes associated with the category, the circular element visually conveying a level of completion of a corresponding number of active processes; and automatically updating the numerical values and the levels of completion visually conveyed on the circular elements when the corresponding processes are completed such that the circular element advances on a clockwise basis until reaching a full circle which indicates that all of the processes for such category are completed, the automatic updating comprising:

executing queries by a radial chart controller class to an interface to a data source to obtain query results specifying a number of open or closed processes, the queries being specified by a configuration class registered with the radial chart controller class and filtered by a leading object attribute value registered with the radial chart controller class.

9. The system of claim 8, wherein the circular element of each micro-radial chart further superimposes a numerical value specifying a total number of processes associated with the category including both active and completed processes.

10. The system of claim 8, wherein the operations further comprise:

receiving user-generated input via the graphical user interface horizontally swiping at least one of the micro-radial charts; and displaying at least one additional micro-radial chart in the second part of the graphical user interface replacing at least one of the plurality of originally displayed micro-radial charts, the at least one additional micro-radial chart illustrating status information for a different one of a plurality of a categories of computer-implemented processes as previously displayed.

11. The system of claim 8, wherein the operations further comprise:

displaying, in a third part of the graphical user interface distinct and separate from the first and second parts of the graphical user interface, further information associated with the entity.

12. The system of claim 9, wherein the operations further comprise:

registering the leading object attribute value with a query configuration provider class; and obtaining a query configuration from the query configuration provider class.

13. The system of claim 12, wherein the operations further comprise:

executing queries against a data source using the query configuration to obtain query results.

14. The system of claim 13, wherein the query results are used to automatically update the numerical values and the levels of completion visually conveyed on the circular elements when the corresponding processes are completed.

15. A computer program product comprising non-transitory media storing instructions, which when executed by at least one computing device, result in operations comprising:

rendering, in a first part of a graphical user interface information, about an entity;

displaying, in a second part of the graphical user interface distinct and separate from the first part of the graphical user interface, a plurality of micro-radial charts that each illustrate status information for one of a plurality of a categories of computer-implemented business processes for the entity, each micro-radial chart having a circular element superimposed around a numerical value specifying a number of active processes associated with the category, the circular element visually conveying a level of completion of the computer-implemented business processes; and automatically updating the numerical values and the levels of completion visually conveyed on the circular elements when the computer-implemented business processes are completed such that the circular element advances on a clockwise basis until reaching a full circle which indicates that all of the processes for such category are completed, the automatic updating comprising:

executing queries by a radial chart controller class to an interface to a data source to obtain query results specifying a number of open or closed processes, the queries being specified by a configuration class registered with the radial chart controller class and filtered by a leading object attribute value registered with the radial chart controller class;

wherein the queries are executed by a configuration framework having a reusable component that provides a graphical user interface with a consistent look and feel across different applications.

16. The computer program product of claim 15, wherein the circular element of each micro-radial chart further superimposes a numerical value specifying a total number of processes associated with the category including both active and completed processes.

17. The computer program product of claim 15, wherein the operations further comprise:

receiving user-generated input via the graphical user interface horizontally swiping at least one of the micro-radial charts;

displaying at least one additional micro-radial chart in the second part of the graphical user interface replacing at least one of the plurality of originally displayed micro-radial charts, the at least one additional micro-radial chart illustrating status information for a different one of a plurality of a categories of computer-implemented processes as previously displayed; and displaying, in a third part of the graphical user interface distinct and separate from the first and second parts of the graphical user interface, further information associated with the entity.

* * * * *